June 5, 1951

A. P. WITHALL 2,555,431

FRICTION SHOCK ABSORBING MECHANISM
FOR RAILWAY DRAFT RIGGINGS

Filed March 5, 1948

2 Sheets-Sheet 1

Inventor:
Albert P. Withall.
By Henry Fuchs.
Atty.

June 5, 1951 — A. P. WITHALL — 2,555,431
FRICTION SHOCK ABSORBING MECHANISM FOR RAILWAY DRAFT RIGGINGS Filed March 5, 1948 — 2 Sheets-Sheet 2

Inventor:
Albert P. Withall.
By Henry Fuchs
Atty.

Patented June 5, 1951

2,555,431

UNITED STATES PATENT OFFICE 2,555,431

FRICTION SHOCK ABSORBING MECHANISM FOR RAILWAY DRAFT RIGGINGS

Albert P. Withall, Chicago, Ill., assignor to W. H. Miner, Inc., Chicago, Ill., a corporation of Delaware Application March 5, 1948, Serial No. 13,237

4 Claims. (Cl. 213—32)

This invention relates to improvements in friction shock absorbing mechanisms for railway draft riggings.

One object of the invention is to provide a friction shock absorbing mechanism of relatively high capacity, especially adapted for railway draft riggings having relatively short pockets for accommodating the mechanism, and more specifically for such pockets of locomotives.

A further object of the invention is to provide a shock absorbing mechanism for relatively short draft rigging pockets, including a friction casing, friction shoes slidingly telescoped within the casing, a pressure transmitting wedge member for spreading the shoes apart into tight frictional engagement with the interior friction surfaces of the casing and forcing the shoes inwardly of the casing, a follower bearing on the wedge, and spring means within the casing yieldingly opposing inward movement of the friction shoes, wherein the friction casing is contained within a spring cage and movement of the follower inwardly toward the friction casing is opposed by additional spring means contained within the spring cage, thereby adding materially to the shock absorbing capacity of the mechanism.

A still further object of the invention is to provide a mechanism as specified in the preceding paragraph, wherein the friction casing, as well as the wedge member, is arranged within the spring cage for ready removal and replacement, thereby materially reducing the cost of repairs when any of the parts of the mechanism become worn or damaged in service.

Other objects of the invention will more clearly appear from the description and claims hereinafter following.

Figure 1:
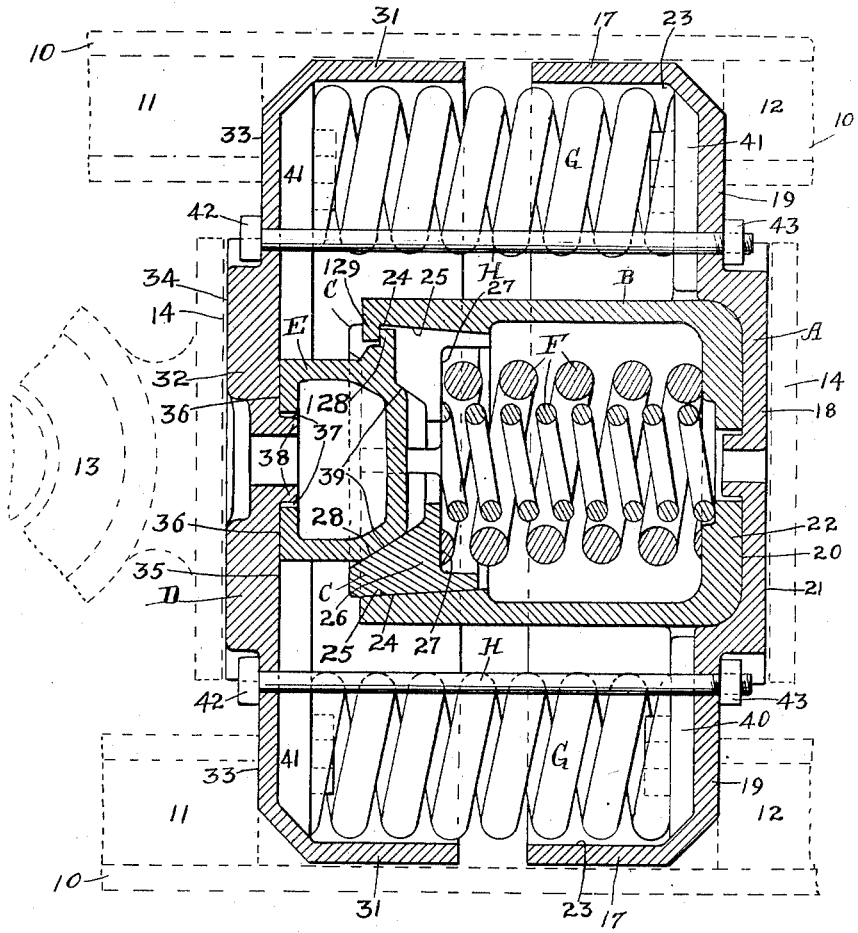
Figure 2:
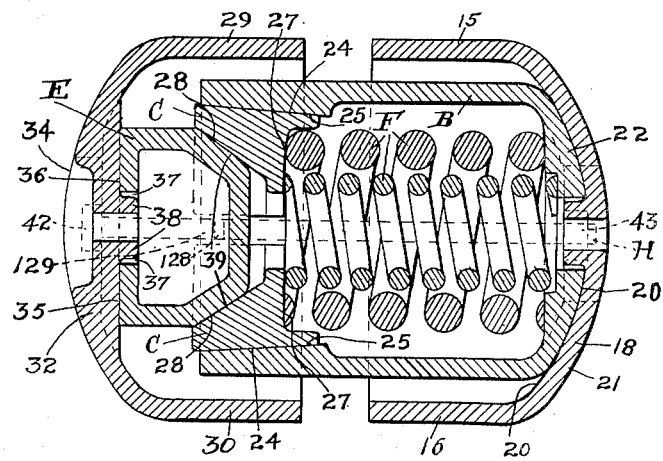
Figure 3:
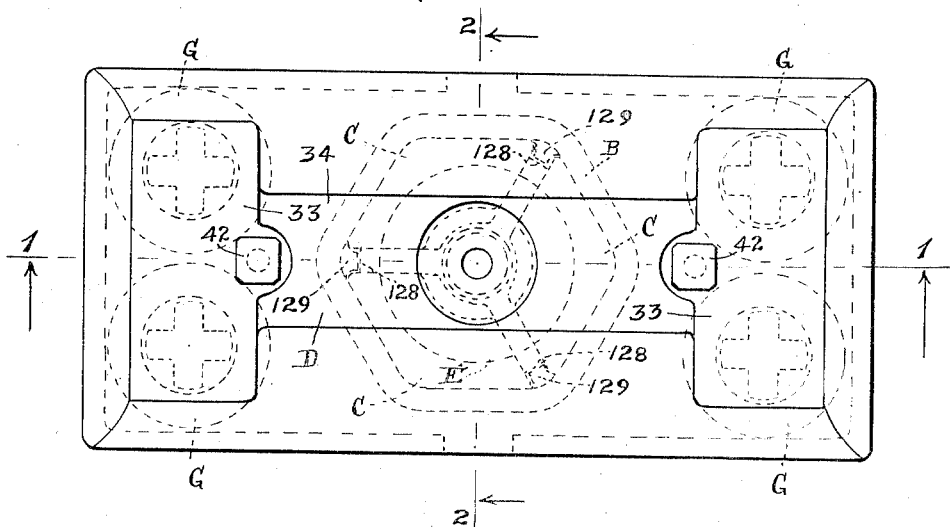

In the accompanying drawings forming a part of this specification, Figure 1 is a horizontal sectional view of my improved friction shock absorbing mechanism, corresponding substantially to the line 1—1 of Figure 3, showing the same in applied position, a portion of the draft gear pocket and a portion of the yoke of the draft rigging being shown in dotted lines. Figure 2 is a longitudinal, vertical sectional view of the friction shock absorbing mechanism shown in Figure 1, corresponding substantially to the line 2—2 of Figure 3. Figure 3 is a front elevational view, looking from left to right in Figure 2.

My improved friction shock absorbing mechanism, as illustrated in the drawings, comprises broadly a spring cage A, a friction casing B, three friction shoes C—C—C, a front follower D, a wedge member E, a spring resistance F within the friction casing opposing inward movement of the shoes, front follower, and wedge member, additional sets of springs G—G and G—G contained within the spring cage opposing inward movement of the follower, and a pair of retainer bolts H—H.

The improved friction shock absorbing mechanism is illustrated in the drawings as contained in the usual draft gear pocket of the underframe structure of a railway locomotive or car, a portion of such underframe structure being shown in dotted lines in Figure 1 and generally indicated by 10. The underframe structure 10 is of the type usually employed in locomotives and presents front and rear stop shoulders or lugs 11—11 and 12—12. The rear end portion of the usual coupler shank, shown in dotted lines, is indicated by 13, to which is operatively connected a yoke 14 of well known construction, also shown in dotted lines. The yoke 14 supports the improved friction shock absorbing mechanism within the draft gear pocket between the front and rear stop lugs 11—11 and 12—12 and transmits the draft and buffing forces thereto.

The spring cage A of my improved friction shock absorbing mechanism is in the form of a rectangular boxlike member, open at its front end and having spaced, horizontally disposed, top and bottom walls 15 and 16, spaced vertical side walls 17—17, and a transverse rear wall 18. The rear wall 18 presents vertically disposed, substantially flat abutment faces 19—19 on the outer side at opposite ends thereof, adapted to cooperate with the rear stop lugs 12—12. The wall 18 is rounded, or vertically curved, between the stop faces, as shown in Figure 2, thus presenting inner and outer, rounded surfaces 20 and 21. The outer surface 21 cooperates with the inner side of the rear end of the yoke 14, which is correspondingly rounded to swivel thereon.

The friction casing B is of hexagonal, transverse cross section, as indicated in Figure 3, and has its rear end closed by a transverse end wall 22, which is flat on its inner side and curved in vertical direction on its outer side to truly seat on the rounded inner surface 20 of the wall 18. The casing B is arranged centrally between the side walls 17—17 of the cage in laterally spaced relation to said walls, thus providing spring pockets 23—23 at opposite sides of the cage. At the outer or open end thereof, the casing B is provided with three interior, inwardly converging friction surfaces 24—24—24 of V-shaped, transverse cross section, each surface 24 being formed by two of the diverging adjacent walls of the hexagonal casing. As shown in Figures 1 and 2, the front end of the casing B projects beyond the front end of the cage A and into the front follower D.

The friction shoes C, which are three in number, are slidingly telescoped within the open end of the casing B. Each shoe C has a friction surface 25 of V-shaped, transverse section on its outer side engaging one of the V-shaped surfaces 24 of the casing B. Each shoe is laterally inwardly enlarged at the forward end portion thereof, as indicated at 26, thus providing a transversely extending abutment face 27 on said shoe at the rear end of the enlargement. The enlargement 26 of each shoe presents a wedge face 28 on the inner side, which is preferably of V-shaped transverse cross section. The wedge faces 28—28—28 of the three shoes converge inwardly of the casing B.

The front follower D is in the form of a hollow boxlike member, having horizontally disposed, vertically spaced, top and bottom walls 29 and 30, laterally spaced, vertical side walls 31—31, and a transverse front end wall 32. The front wall 32 presents vertically disposed, substantially flat abutment faces 33—33 on the outer sides at opposite ends thereof, adapted to cooperate with the front stop lugs 11—11. The wall 32 is rounded, or vertically curved, between the stop faces 33-33, as shown in Figure 2, thus presenting an outer rounded or vertical surface 34, which cooperates with the inner side of the front end portion of the yoke 14, which is correspondingly rounded to swivel thereon. The wall 32 is inwardly thickened at its central portion to provide a flat abutment surface 35 for the wedge member E. The transverse dimensions of the follower D correspond to those of the cage A so that the ends of the top, bottom, and side walls of these two members will abut when the mechanism is closed. As will be evident, the front follower D and the cage A, in effect, provide hollow front and rear follower members which house the parts of the mechanism.

The wedge E is in the form of a hollow block having a transverse front end wall 36 bearing on the flat abutment surface 35 of the follower D. To hold the wedge E centered against lateral displacement, the front wall is provided with a recess or seat 37, within which a centering boss 38, projecting from the surface 35, is engaged. The wedge E presents three rearwardly extending, exterior wedge faces 39—39—39 of V-shaped, transverse section, correspondingly inclined to and engaging respectively with the wedge faces 28—28—28 of the shoes C—C—C. The wedge is further provided with three radially projecting retaining lugs 128—128—128 extending respectively between adjacent friction shoes and engaging in back of three inturned lugs 129—129—129 at the open ends of the casing for limiting outward movement of the wedge with respect to the casing and holding the parts assembled.

The spring resistance F comprises a relatively light inner coil and a heavier outer coil arranged within the casing B and interposed between the closed rear end of the casing and the friction shoes C—C—C, having their front and rear ends bearing respectively on the abutment faces 27 of the shoes and the flat inner surface of the end wall 22 of the casing B.

The springs G—G and G—G are contained within the cage A and extend into the follower D, being arranged in pairs at opposite sides of the friction casing B within the spring pockets 23—23. The springs G—G of each pair bear at opposite ends, respectively, on ribs 40—40 on the rear wall 18 of the spring cage A and ribs 41—41 on the interior of the follower D, and yieldingly oppose relative approach of the follower D and the spring cage A.

The mechanism is held assembled by the retainer bolts H—H, which are arranged at opposite sides of the casing B and extend through the end walls 32 and 18 of the follower D and cage A, being anchored to the followed D by heads 42—42 at the front ends of the bolts engaging the wall 32, and to the cage A by nuts 43—43 at the rear ends of the bolts engaging the wall 18.

The operation of my improved friction shock absorbing mechanism is as follows: Upon outward movement of the coupler in draft, the yoke pulls the spring cage A forwardly, compressing the mechanism against the front stop lugs 11—11 and forcing the cage A toward the follower D and wedge E, the wedge E and the follower D being held stationary by the front stop lugs. In buff, the coupler is moved inwardly, carrying the yoke therewith and compressing the mechanism against the rear stop lugs 12—12, the follower D and the wedge E being forced rearwardly toward the spring cage A, and the latter being held stationary against rearward movement by the stop lugs 12—12. As the follower D, together with the wedge E, and the cage A are moved lengthwise of the mechanism with respect to each other in either buff or draft, the springs G—G and G—G are compressed between the front wall of the follower D and the rear wall of the cage A, and the wedge E moves inwardly of the casing B, wedging the shoes apart and also forcing the same rearwardly of the casing against the spring resistance F. High frictional resistance is thus produced in addition to the resistance provided by the four springs G—G and G—G. Compression of the mechanism continues until inward movement of the follower D and the wedge E is limited by engagement of the former with the cage A, thereby preventing over compression of the springs. When the actuating force is reduced, the springs return all of the parts to the normal full release position shown in Figures 1 and 2, the springs G—G and G—G acting to directly force the follower D outwardly and the spring resistance F also acting to force the same outwardly by projecting the shoes, which are in wedging engagement with the wedge E, which, in turn, bears on the follower D.

From the preceding description taken in connection with the drawings, it will be evident that, inasmuch as both the friction casing and the wedge member of the friction mechanism are formed as separate elements from the spring cage and front follower, the same may be readily removed and replaced when either of the same, or both, become damaged or worn in service, thus greatly reducing the cost of repairs.

I claim:

1. In a friction shock absorbing mechanism, the combination with a spring cage open at one end and having a transverse abutment wall at the other end; of a follower at said open end of the cage, said follower being movable toward the cage; a wedge member bearing on said follower and being movable with said follower toward said cage; a separate friction casing within said spring cage, said casing being buttressed at one end against said transverse abutment wall of the cage, said casing having interior friction surfaces; friction shoes within the casing slidable on the friction surfaces thereof; cooperating wedge faces on said shoes and wedge member; a spring within the casing yieldingly opposing inward movement of the shoes; and spring means within said spring cage at opposite sides of the friction casing bearing at the outer end on said follower to yieldingly oppose inward movement of said follower.

2. In a friction shock absorbing mechanism, the combination with a spring cage, said cage being open at one end and having a transverse abutment wall at the other end; of a combined follower and wedge unit at the open end of said cage, said unit comprising a follower member proper, and a separate wedge bearing on the inner side of said follower, said cage and unit being relatively movable toward and away from each other; a separate friction casing being buttressed at one end against said transverse wall of the cage, said casing within said spring cage, said casing having interior friction surfaces at the other end; friction shoes within the casing slidable on the friction surfaces thereof; cooperating wedge faces on said shoes and the wedge of said unit; a spring within the casing yieldingly opposing inward movement of the shoes; and two pairs of springs within said cage, said pairs being disposed at opposite sides of the friction casing and bearing on said follower member to yieldingly oppose inward movement of the follower member of said unit.

3. In a friction shock absorbing mechanism, the combination with a spring cage; of a combined follower and wedge unit, said cage and unit being relatively movable toward and away from each other; a separate, removable friction casing within said spring cage, said casing being closed at one end and open at the other end, said casing having interior friction surfaces at said open end; friction shoes within the casing slidable on the friction surfaces thereof; cooperating wedge faces on said shoes and the wedge of said unit; a spring within the casing bearing at one end on the closed end of the casing, and at the other end on said shoes to yieldingly oppose inward movement of the shoes; and additional springs within said spring cage, exterior to said casing and bearing on said follower to directly oppose inward movement of the follower of said unit with respect to said cage.

4. In a friction shock absorbing mechanism, the combination with a spring cage; of a combined follower and wedge unit, said cage and unit being relatively movable toward and away from each other; a separate friction casing within said spring cage, said casing having a transverse abutment wall at one end and interior friction surfaces at the other end; friction shoes within the casing slidable on the friction surfaces thereof; cooperating wedge faces on said shoes and the wedge of said unit; a spring within the casing bearing at opposite ends on said abutment wall and the inner ends of said shoes to yieldingly oppose inward movement of the shoes with respect to said casing; and additional spring means engaged by and directly opposing inward movement of the follower of said unit, said additional spring means comprising springs arranged in pairs within the spring cage at opposite sides of said casing.

ALBERT P. WITHALL.

REFERENCES CITED

The following references are of record in the file of this patent:

UNITED STATES PATENTS

| Number | Name | Date |
| --- | --- | --- |
| 1,136,008 | Haseltine | Apr. 20, 1915 |
| 2,354,826 | Olander | Aug. 1, 1944 |
| 2,469,549 | Dath | May 10, 1949 |